United States Patent [19]

Cahill

[11] Patent Number: 5,077,757
[45] Date of Patent: Dec. 31, 1991

[54] SYSTEM FOR SYNTHESIZING A MODULATED SIGNAL

[75] Inventor: Stephen V. Cahill, Palatine, Ill.

[73] Assignee: Motorola, Inc., Schaumburg, Ill.

[21] Appl. No.: 559,774

[22] Filed: Jul. 30, 1990

[51] Int. Cl.⁵ .................. H04L 27/12; H03C 1/52
[52] U.S. Cl. ........................... 375/59; 375/67; 332/103
[58] Field of Search ............. 375/39, 54, 59, 61, 375/62, 67; 332/103, 104, 145

[56] References Cited

PUBLICATIONS

Digital Communications, John G. Proakis, pp. 171–178.
Introduction to Communication Systems, F. G. Stremler, pp. 590–596.

Primary Examiner—Benedict V. Safourek
Assistant Examiner—Young Tse
Attorney, Agent, or Firm—Robert H. Kelly

[57] ABSTRACT

A modulation system and associated method therefor for synthesizing a modulated signal. Information is converted into an in-phase signal portion and a quadrature signal portion. The two signal portions are combined by summation and difference operations, and the results are stored in registers. A multiplexer samples the resultant values stored in the registers wherein each register is sampled at least once during a period defined by a frequency of a carrier. The output of the multiplexer is a synthesized, modulated signal.

18 Claims, 4 Drawing Sheets

SYSTEM FOR SYNTHESIZING A MODULATED SIGNAL

BACKGROUND OF THE INVENTION

The present invention relates generally to modulation techniques, and, more particularly, to a system, and associated method, for synthesizing a modulated signal.

A radio communication system permits transmission of information between a transmitter and a receiver. The transmitter and the receiver are interconnected by a radio-frequency channel to permit transmission of information therebetween.

By combining the information with a radio-frequency electromagnetic wave of a particular frequency, i.e., modulating the information signal onto a carrier, the resultant, modulated information signal may be transmitted through free space to transmit thereby the information from the transmitter to a receiver. Various modulation techniques (such as, for example, amplitude, frequency, phase, and composite modulation) are known to combine the information signal with an electromagnetic wave.

The total communications capacity in a geographic area is limited by the finite amount of electromagnetic spectrum available. Increasing capacity is most practically achieved by increasing the efficiency of the modulation method used; i.e. by reducing the amount of frequency spectrum required to transmit the information signal. For example, when the information signal is a speech waveform, significant redundancy is present. Some of this redundancy can be removed by using one of a variety of known techniques for encoding the speech waveform with an encoder. The encoded information signal uses less bandwidth.

The output of such an encoder is a discrete binary data stream, whose elements represent various characteristics of the input speech waveform. This binary data stream can be appropriately filtered and modulated onto a carrier at a frequency appropriate for transmission. Independent of modulation method, this binary data stream, because it represents the speech waveform with some of the redundancy removed, requires less bandwidth to transmit, relative to the original speech information signal. The reduced bandwidth permits either more frequency channels for a given allocation of spectrum, or intermittent use of channels in place of continuous use as required for direct speech waveform modulation.

Transmission of the information in discrete form is also advantageous for the reasons that the audio quality of a discrete, encoded signal is superior to a signal generated by conventional continuous wave techniques as the noise components of the transmitted signal may be removed from the signal during reconstruction thereof by the receiver decoder which reconstructs the speech signal from a received estimate of the binary data stream. Still further, scrambling of a signal may be much more easily effectuated as a discrete, encoded signal may be scrambled by the information source and descrambled by an information receiver more easily than a continuous wave analog signal. Additionally, data generated by the vast majority of computer systems is in discrete form, and such discrete information may be more easily transmitted by a discrete encoder rather than by conventional continuous wave techniques. Still further, discrete, encoded signals may be transmitted at various transmission rates (such as, for example, in terms of baud rate—e.g., kilobits per second). Discrete, encoded signals transmitted at higher bit rates, when decoded, recreate a better quality signal. Different levels of service are thereby possible. The radiotelephone system operator, who provides service to users at a price, may permit users to transmit encoded signals at different bit rates at prices corresponding to the bit rates of transmission.

Further efficiency can be achieved by choice of the method of modulating the information signal (of whatever form) onto the carrier. In traditional mobile radiotelephone service, the modulation method is usually frequency modulation (FM). This method, because it passes information only through the phase of the carrier (the amplitude is constant) uses more bandwidth than necessary. Composite modulation, in which information is encoded in both the amplitude and the phase of the carrier signal, uses channel capacity more efficiently.

However, existing composite-modulation communication systems and apparatus therefor are quite complex. Conventional practice is to separate the transmit carrier source (or a carrier intermediate frequency, i.e., IF, source) into sine and cosine components, mixing each component with separate portions of the information signal input, and summing the mixer outputs. The resultant modulated signal, if it is at carrier frequency, can be applied directly to an amplifier for amplification to final transmit power level. If the resultant modulation signal is at a carrier IF, it is further multiplied by a LO oscillating signal to shift it in frequency to the proper carrier frequency, and then amplified. See, for instance, a discussion in the text *Introduction to Communication Systems*, 2nd Ed, by Ferrel G. Stremmler, ISBN 0-201-07251-3, pages 590–596.

A family type of composite modulation is quadrature amplitude modulation (QAM). In this modulation method, as conventionally applied to a binary information source, the binary data stream is separated into bit pairs. The individual bits of these bit pairs are converted from unipolar to bipolar format, passed through a pair of electric wave filters, and applied to the multiplier pair whose other inputs are the sine and cosine components of the carrier or carrier IF signal. A particular type of QAM is $\pi/4$-shift DQPSK (for differential quadrature phase shift keying), in which the input data stream is encoded so that the composite modulated carrier shifts in increments of $\pm \pi/4$ or $\pm 3\pi/4$ according to the input bit pairs. This modulation method, conventionally implemented, is discussed in *Digital Communications*, by John G. Proakis, 1st Ed., ISBN 0-07-050927-1, pages 171–178.

Because the process of mixing the information signal with the carrier wave is essentially a multiplication process, such a process, when implemented by existing communication system apparatus, requires complicated circuitry having precise component constraints.

What is needed, therefore, is a system for synthesizing a modulated signal, such as, for example, a discrete encoded, modulated signal, which does not require precise components and complicated circuitry for synthesis thereof.

SUMMARY OF THE INVENTION

It is, accordingly, an object of the present invention to provide a system for synthesizing a composite modulated signal.

It is a further object of the present invention to provide a communication system and method therefor for transmitting electromagnetic signals having information signals modulated in composite form thereupon.

In accordance with the present invention, therefore, a modulation system for synthesizing a modulated signal at a carrier frequency is disclosed. The modulation system converts an input signal into input signal portions comprised of at least a first input signal portion and a second input signal portion, wherein any two of the input signal portions are maintained in a known timing relation therebetween. Any two or more of the input signal portions are combined at desired times to form resultant values thereby. The resultant values are sampled at a predetermined sampling rate, and an output signal is generated which is comprised of discrete signal values indicative of the resultant values which are comprised of various combinations of the first and the second input portions.

Preferably, the combinations of input signal portions are in a relationship such that when repetitively sampled in sequence, a discrete representation of a composite modulated signal is created. The sampled signal may be applied to a bandpass electric wave filter or filters of bandwidth sufficient to substantially remove spectral components generated by the sampling process and by the periodic modification of the input portions.

BRIEF DESCRIPTION OF THE DRAWINGS

The present invention will be better understood when read in light of the accompanying drawings in which.

DESCRIPTION OF THE PREFERRED EMBODIMENTS

Any narrowband electromagnetic wave may be described mathematically by a combination of a scaled sine wave, and a scaled cosine wave. A narrowband electromagnetic wave may, therefore, be represented by the equation:

$$s(t) = I(t) \cos(wt) + Q(t) \sin(wt)$$

wherein:

I(t) and Q(t) are functions of time scaling the cosine and sine components of a carrier, sometimes called in-phase and quadrature components;

w is angular frequency of the carrier (or $2\pi f$, the cyclic frequency); and t is time (in seconds).

Figure 1:
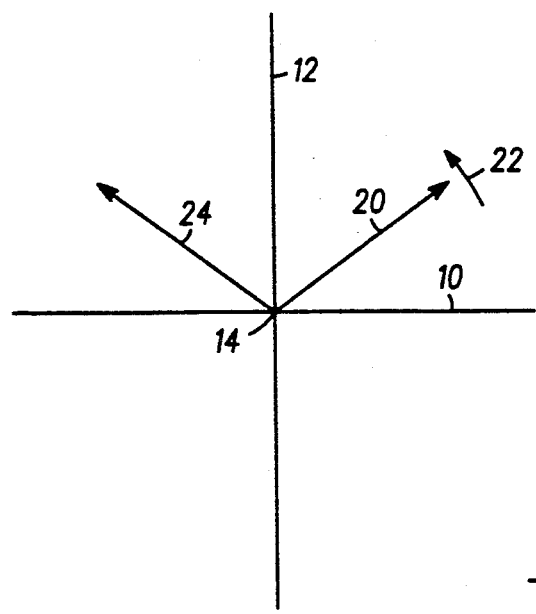
FIG. 1 is a graphical representation of an axis system utilized to describe an electromagnetic signal generated according to the system of the present invention.

The above equation may be graphically represented by plotting the sum of the cosine and sine terms as a function of time; alternately, the equation may be graphically represented on the axis system illustrated in FIG. 1. Abscissa axis 10 is scaled in terms of cos (s(t)), the cosine component of the waveform, and the ordinate axis 12 is scaled in terms of sin (s(t)), the sine component of the waveform. Abscissa axis 10 and ordinate axis 12 intersect at origin 14. Because, as mentioned above, any electromagnetic wave (disregarding harmonics) may be represented by the above equation, the electromagnetic wave may be graphically represented, at any point in time, by a point on the axis system 10-12.

In conventional notation, a vector is formed to interconnect the origin 14 of the axis system and the point defining the electromagnetic wave. Over time, the magnitude and phase of vector 20 varies according to the value of the I(t) and Q(t) terms.

An electromagnetic wave comprised of both a cosine and a sine wave component may be described by a vector plotted upon the axis system of FIG. 1. A vector, such as vector 20 extending between origin 14 and the point defining the wave represents the wave at a particular time. At a subsequent time, the coordinates of the point defining the electromagnetic wave, and the vector formed therefrom, varies according to the above equation. More particularly, when plotted on the axis system of FIG. 1, the coordinates of the point defining the wave at subsequent times, and the vectors formed therefrom, rotate about the origin in a counterclockwise direction, indicated by arrow 22. A vector representing the electromagnetic wave at one subsequent point in time may be represented by vector 24. Because both cosine and sine are periodic functions, the summation of the cosine and the sine component portions according to the above equation is also a periodic function. Over time, therefore, vectors representing a constant-frequency electromagnetic wave, when plotted, rotate repeatedly in the counterclockwise direction (indicated by arrow 22) about origin 14. Commonly, therefore, an electromagnetic wave of a particular cyclic frequency, f, is referred to as a "rotating vector". The rotating vector rotates about origin 14 of the axis system of FIG. 1 at a periodic rate dependent upon the frequency of the wave. For example, an electromagnetic wave having a cyclic frequency of 900 megahertz is represented on the axis system of FIG. 1 by a rotating vector which rotates about the origin 14 at a frequency of 900 megahertz.

Figure 2:
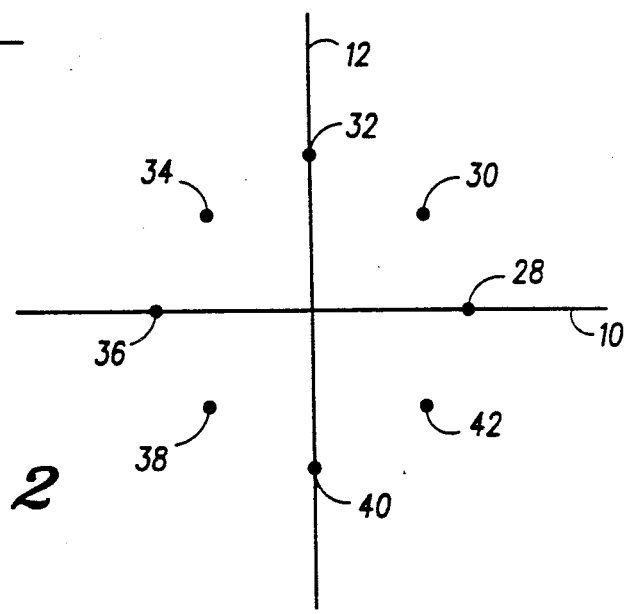
FIG. 2 is a graphical representation of a discrete encoding scheme which may be utilized by the system of the present invention.

The modulation portions of a modulated carrier may be represented graphically in the same format, separated from the rotation of the unmodulated carrier portion. This is commonly referred to as "baseband format". An example of this is FIG. 2, which shows the points, here indicated by reference numerals 28-42, formed by plotting Q(t) vs. I(t). The constellation of vector tip locations so formed is that of $\pi/4$-shifted DQPSK, discussed more fully hereinafter.

Figure 3:
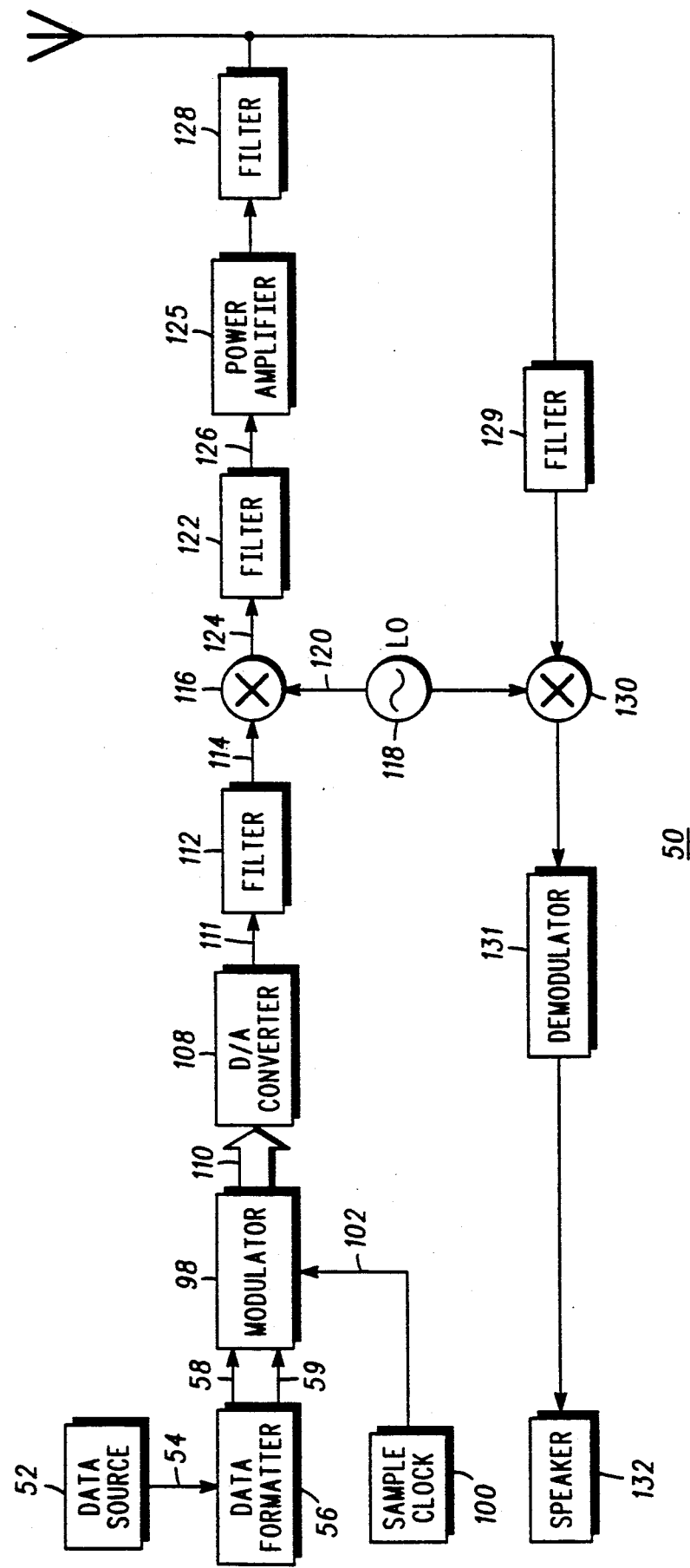
FIG. 3 is a block diagram of a transmitter constructed according to the teachings of the present invention.

Turning now to the block diagram of FIG. 3, there is shown a radiotelephone, referred to generally by reference numeral 50, which embodies a transmitter incorporating the modulation system of the present invention. Radiotelephone 50 generates electromagnetic signals having an information signal modulated thereupon. The information to be transmitted is supplied by data source 52 typically comprised of a microphone followed by a redundancy-removing encoder which outputs data, preferably in sequential form, on line 54. Data source 52 may additionally comprise another type of information source such as, for example, a computer output, etc.

The data output of data source 52 on line 54 is supplied to data formatter 56. As will be described more fully hereinbelow, data formatter 56 formats the data supplied thereto in a particular form.

Data formatter 56 supplies the data formatted therein on lines 58 and 59 to modulator 98. Sample clock source 100 generates a constant frequency signal which is supplied to modulator 98 on line 102. As will also be described more fully hereinbelow, modulator 98 modulates the formatted data supplied thereto on lines 58 and 59 with the clock signal supplied to the modulator 98 on line 102.

A modulated signal formed by modulator 98 is supplied to digital-to-analog converter 108 on line 110. Digital-to-analog converter 108 converts the digitally encoded signal supplied thereto on line 110 into an analog signal which is supplied to filter 112 on line 111. Filter 112 contains a passband to pass a frequency band centered at the frequency (or centered to permit passage otherwise) of the signal generated by carrier source 100. Filter 112 generates a filtered signal on line 114 which is supplied to mixer 116.

Mixer 116 also receives a cyclic signal generated by oscillator 118 on line 120. Mixer 116 mixes the oscillating signal generated by oscillator 118 and the filtered signal generated by filter 112. Mixer 116 converts the signal generated on line 114 into a transmission frequency signal. Preferably, oscillator 118 is of a design which permits the frequency of the oscillating signal generated thereby to be varied and thus different transmit frequencies to be chosen.

The mixed signal generated by mixer 116 is supplied to filter 122 on line 124. Similar to filter 112, filter 122 contains a passband to pass the information signal centered about a center frequency. The filtered signal is supplied to power amplifier 125 on line 126 for transmission via antenna 127. Amplifier 125 may, for example, be comprised of a class-AB, 800–900 megahertz, 6 watt power amplifier. Prior to transmission of the amplified signal, and as illustrated, the amplified signal may be further filtered by filter 128. Filter 128 is positioned in-line between amplifier 125 and antenna 127.

Also illustrated in FIG. 3 is the radiotelephone receive circuit for receiving a signal transmitted to antenna 127. The signal transmitted to antenna 127 is supplied to filter 129 which passes signals of desired frequencies to mixer 130. Mixer 130 is coupled to receive an oscillating signal from oscillator 118, and generates a mixed signal which is supplied to demodulator/decoder 131. Demodulator/decoder 131 supplies a demodulated electrical information signal to speaker 132 which converts the electrical information signal supplied thereto into audible signals.

Figure 4:
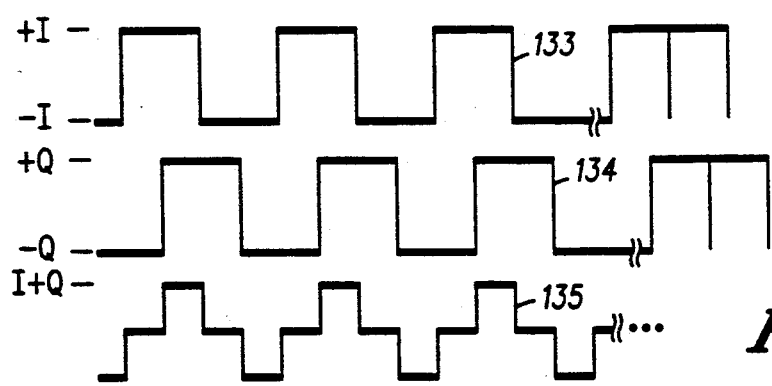
FIG. 4 is a graphical representation of in-phase and quadrature-phase modulation signals for a particular input data bitpair, and the combination thereof which forms the modulated signal of the system of the present invention.

FIG. 4 illustrates waveforms 133, 134, and 135. The repetition period of the waveforms 133, 134 and 135 defines the period of the carrier frequency. Waveform 133 is a binary pulse train having values of $+I'(t)$ and $-I'(t)$. Waveform 134 is a binary pulse train having values of $+Q'(t)$ and $-Q'(t)$. Waveform 135 is a resultant waveform, and is formed by combining waveforms 133 and 134. The combination of waveforms to form waveform 135 illustrates how a rotating modulated carrier is synthesized for a particular $(I'(t),Q'(t))$ point in baseband format by creating successive outputs of $(I'(t)+Q'(t))$, $(-I'(t)+Q'(t))$, $(-I'(t)-Q'(t))$, $(I'(t)-Q'(t))$ cyclically. Mathematically, the operation of stepping between the four samples of the sums and differences of the $I'(t)$ and $Q'(t)$ values generates the same output as multiplying $I'(t)$ and $Q'(t)$ by sine and cosine components of the carrier, and then performing the summation operation, excluding the consideration of harmonics. The sampling operation produces additional frequency components at harmonics of the carrier of carrier IF produced. Additional frequency components are also produced by the updating of the $I'(t)$, $-I'(t)$, $Q'(t)$ and $-Q'(t)$ values in the summation registers, which will be discussed with reference to FIG. 5 hereinbelow. These additional frequency components will be separated in frequency from the modulated carrier by a spacing equal to the update rate frequency. Thus, a narrowband bandpass filter follows the modulator to remove the additional frequency components, if these components are undesired.

The waveforms 133–135 illustrate the transformation from the conventional multiplication of sine and cosines to the operation of the present invention. Waveform 133 illustrates a "squared-up" version of $I'(t) \cos(wt)$, and waveform 134 illustrates a "squared-up" version of $Q'(t) \sin(wt)$. Waveform 135 illustrates the summation of these two waveforms. The "squaring-up", or limiting of resultant products to $\pm I'(t)$ or $\pm Q'(t)$, creates harmonics of the carrier but is otherwise equivalent to multiplying cosine or sine by $I'(t)$ or $Q'(t)$. Given this, it becomes apparent that the summation can be moved to the input point, and the creation of waveform 135 then becomes a matter of switching between the four summation registers successively. This eliminates the difficult operation of analog multiplication and summation performed at carrier frequency. Resultant waveform 135 is representative of formatted data which is formatted by data formatter 56, shown in the block diagram of FIG. 3.

Figure 5:
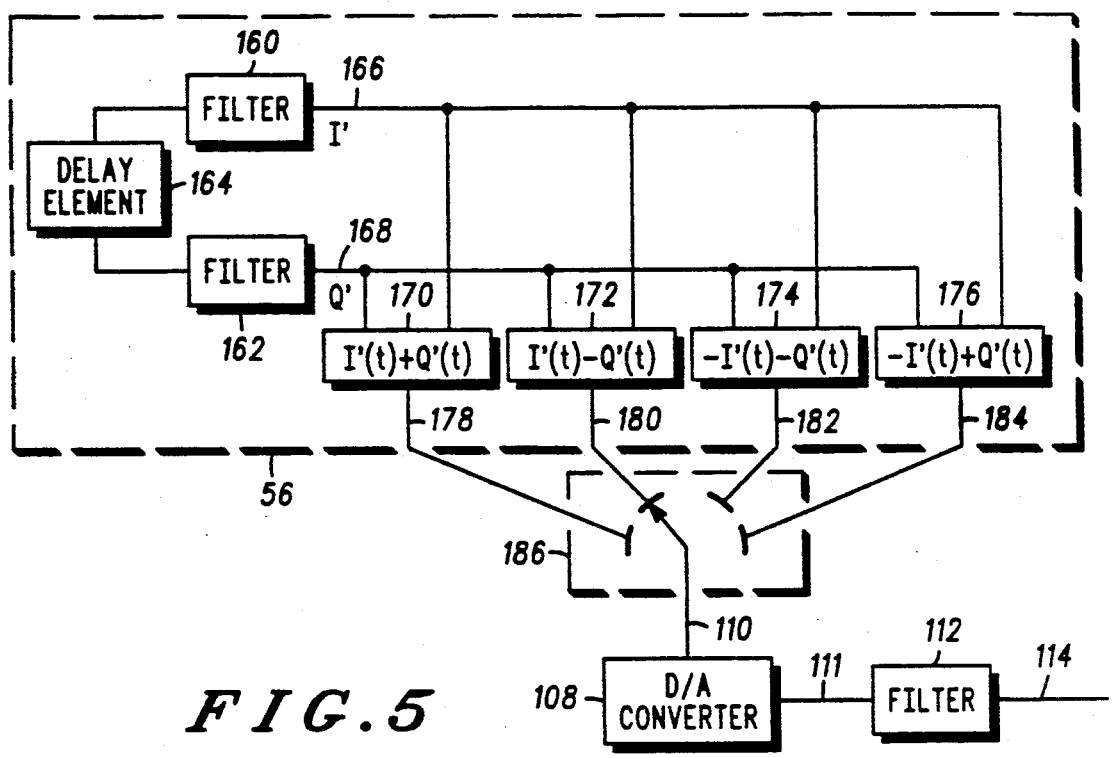
FIG. 5 is a block diagram of a portion of the transmitter of FIG. 3.

FIG. 5 illustrates a more detailed diagram of data formatter 56 shown in block form in FIG. 3 which is utilized in the preferred embodiment of the present invention to synthesize a waveform such as waveform 135. An input signal is supplied to filters 160 and 162 (the input signal is applied to filter 162 by way of delay element 164).

Filters 160 and 162 generate a finite number of discrete output signal pairs on lines 166 and 168, respectively, for a single discrete input pair; the discrete output signals are referred to by $I'(t)$ and $Q'(t)$, respectively. The $I'(t)$ and $Q'(t)$ signals are supplied to summing registers 170, 172, 174, and 176. Register 170 sums the values of $I'(t)$ and $Q'(t)$, (i.e., forms the summation of $I'(t)+Q'(t)$); register 172 forms the difference of $I'(t)$ and $Q'(t)$, (i.e., $I'(t)-Q'(t)$); register 174 forms the difference of negative $I'(t)$ and negative $Q'(t)$, (i.e., $-I'(t)-Q'(t)$); and register 176 forms the summation of negative $I'(t)$ and $Q'(t)$ (i.e., $-I'(t)+Q'(t)$). Each register 170–176 further stores the resultant values indicative of the respective mathematical operations performed thereat. Registers 170–176, thereby, store the values of each of the possible values of waveform 135 of FIG. 4. Registers 170, 172, 174, and 176 supply outputs on lines 178, 180, 182, and 184 indicative of the resultant values stored in the respective registers.

Lines 178–184 are each supplied to commutating sampler which, as illustrated in the preferred embodiment of FIG. 5, comprises a commutator 186 to sample the values of the signals on each of the lines 178–184 at a predetermined rate. Specifically, commutator 186 samples each of the registers 170–176 to form a waveform on line 110 similar to waveform 135 of FIG. 4. By increasing the rate at which the commutator 186 commutes between adjacent lines of lines 170–176, the frequency of the waveform formed on line 110 is similarly increased. Therefore, in order to generate a waveform on line 110 of a desired frequency, commutator 186 must sample each of the registers 170–176 during each cycle of the carrier signal generated by carrier source 100. Commutator 186 which samples the values of the signals on lines 178–184 may, for example, be embodied by a multiplexer. The rate at which the multiplexer is clocked determines the frequency of the signal formed on line 110. When commutator 186 is comprised of a multiplexer, a clock forms the carrier source 100 shown in FIG. 3 as the clock rate of the clock increments the multiplexer to cause a cyclic signal of a certain frequency to be formed on line 110.

Similar to the block diagram of FIG. 3, D/A converter 108 generates an analog signal on line 111 which is supplied to filter 112. Filter 112 is required to remove harmonics generated by the switching of the commutator 186. A filtered, analog information signal having signal levels encoded thereupon is passed by filter 112 on line 114.

Figure 6:
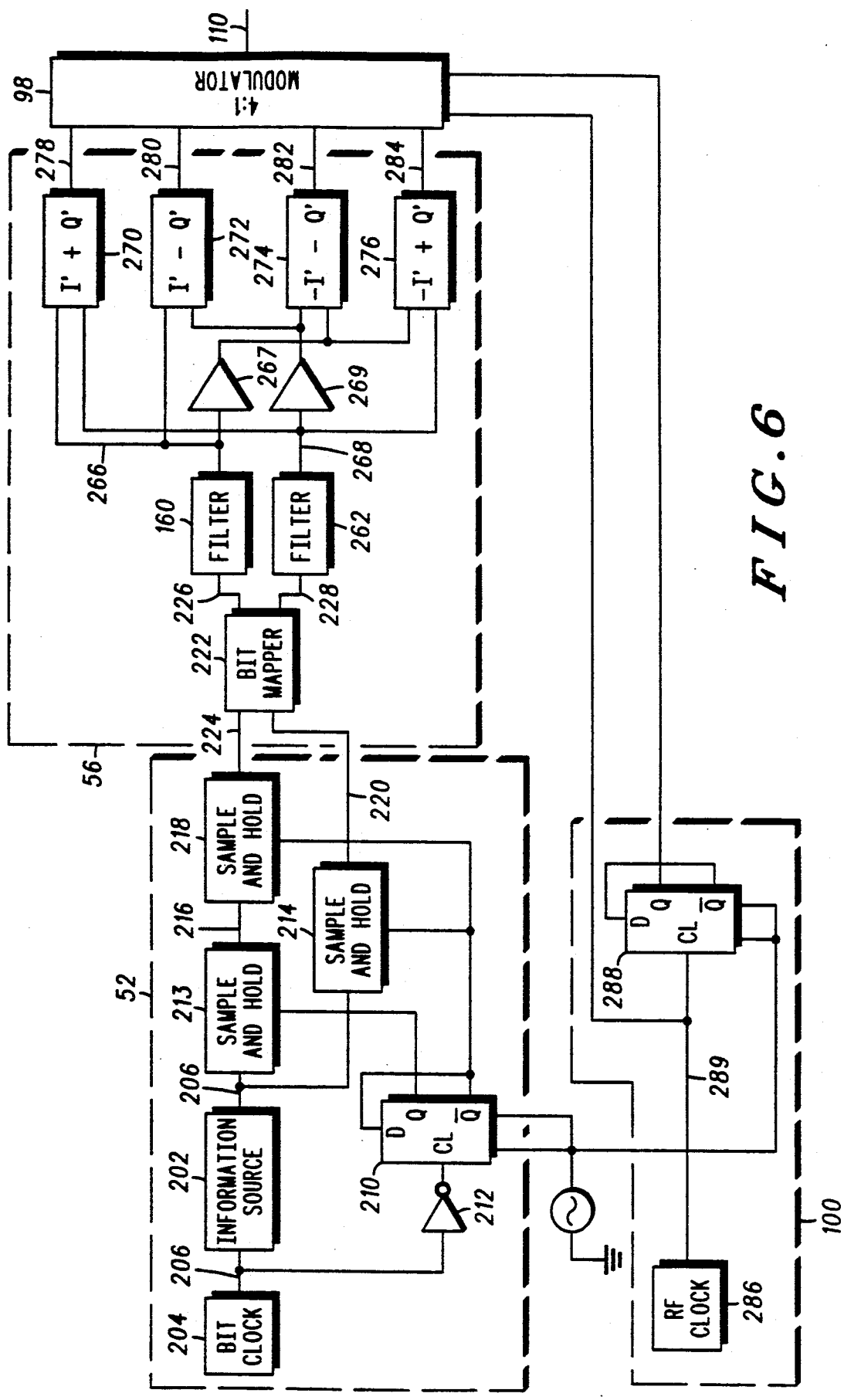
FIG. 6 is a block diagram of one circuit which may be utilized to construct the transmitter portion of FIG. 5.

Turning now to FIG. 6, a circuit implementation of the data formatter 56 and modulator 98 embodying the modulation system of the present invention is shown in block form. While FIG. 6 illustrates a preferred implementation of the modulation system of the present invention, other embodiments are, of course, similarly possible.

Corresponding to the block diagram of the radio transmitter 50 of FIG. 3, FIG. 6, illustrates, in hatched lines, data source 52, data formatter 56, modulator 98, and carrier source 100.

Data source 52 is comprised of information source 202 which receives clock inputs from bit clock 204 on line 206. Responsive to clock signals received from bit clock 204, information source 202 generates outputs on lines 208.

The clock signals generated by bit clock 204 are also supplied to D flip-flop 210 through inverter 212. The Q output of flip-flop 210 is supplied to sample and hold circuit 213. The information signal generated by information source 202 is also supplied to sample and hold circuit 213, as well as sample and hold circuit 214. The inverse Q output of flip-flop 210 is also supplied to sample and hold circuit 214. Sample and hold circuits 213 and 214, thereby, receive the same information signal on line 208, but are clocked by opposite Q outputs of the flip-flop 210.

Sample and hold circuit 213 generates an output on line 216 which is supplied to sample and hold circuit 218. Sample and hold circuit 214 generates an output on line 220 which is supplied to bit mapper 222. The output of sample and hold circuit 218 is also supplied to bit mapper 222 on line 224.

The operation of inverter 212, flip-flop 210, sample and hold circuit 213, sample and hold circuit 214, and sample and hold circuit 218 is such as to convert a serial bitstream generated by information source 202 (which may represent for instance a speech waveform encoder) into a serial set of ordered bit pairs on lines 220 and 224. Bit mapper 222 converts the information signals supplied thereto on lines 224 and 220, into coordinate pairs similar to the coordinate pairs forming points 28–42 of FIG. 2 which may be represented by the vector notation of FIG. 2. Bit mapper 222 generates output signals on lines 226 and 228 which are supplied to filters 260 and 262, respectively.

As mentioned previously, filters 260 and 262 generate a number of discrete output signals for each input supplied thereto on line 226 or 228, respectively. The outputs of filter 260 are supplied on line 266, a branch of which passes through inverter 267. Similarly, filter 262 generates output signals on lines 268, a branch of which passes through inverter 269.

The output signals of filters 260 and 262 and the inversions thereof are supplied to registers 270, 272, 274, and 276, whereat summing or difference operations are performed as indicated. Registers 270–276 further store the resultant values of the summing or difference operations performed therein, and supply outputs on lines 278, 280, 282, and 284, respectively, to commutator 186. Commutator 186 comprises a four to one multiplexer which samples the values of the resultant values stored in registers 270–276 at a frequency determined by carrier source 100.

Carrier source 100 is comprised of clock 286 and D flip-flop 288. Clock 286 supplies a clock signal on line 289 which is supplied to the clock input of flip-flop 288 and to a clock input of the multiplexer which comprises commutator 186. The Q output of flip-flop 288 is also supplied to the multiplexer. By selecting the clock frequency of clock 286 to be four times the frequency desired of the waveform synthesized on line 110, the contents of each register 270–276 are sampled one time during each cycle of the resultant synthesized waveform. The waveform generated on line 110 may, as described previously in connection with transmitter 50 of FIG. 3, be supplied to a digital-to-analog converter, passed through filter circuitry, converted into a transmission frequency, and amplified by amplifying circuitry.

Figure 7:
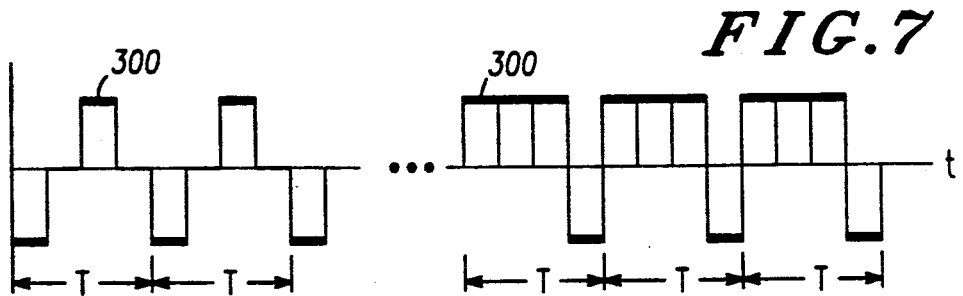
FIG. 7 is a graphical representation of a typical discrete waveform generated by the modulation system of the present invention.

FIG. 7 is a graphical representation of typical signals generated by modulator 98 and supplied on line 110. Waveform 300 is cyclic, and repeats at a frequency which is related to time period T, where $T = 1/f$, f being the frequency of the carrier. The shape of the waveform 300 (i.e., the information content) during successive periods T remains constant until the contents of registers 170–176 changes. As the frequency of waveform 300 is several order of magnitudes greater than the rate at which the information source 202 generates new discrete information signals, the shape of the waveform 300 remains constant for many periods T. However, when new discrete information signals are generated by source 202, the appearance, and, hence, the information content, of waveform 300 changes. A representative waveform having a different wave shape is shown in the right-hand side portion of the graph of FIG. 7.

The system of the present invention, therefore, synthesizes an electromagnetic signal of any desired frequency and modulates a composite information signal thereupon without the requirement of a mixing process. Because a carrier frequency signal is generated by merely clocking a multiplexer at a desired frequency, a high frequency signal having composite information signals modulated thereupon may be formed. Once transmitted and received, the encoded signal generated by the system of the present invention may be easily decoded by existing receivers.

Figure 8:
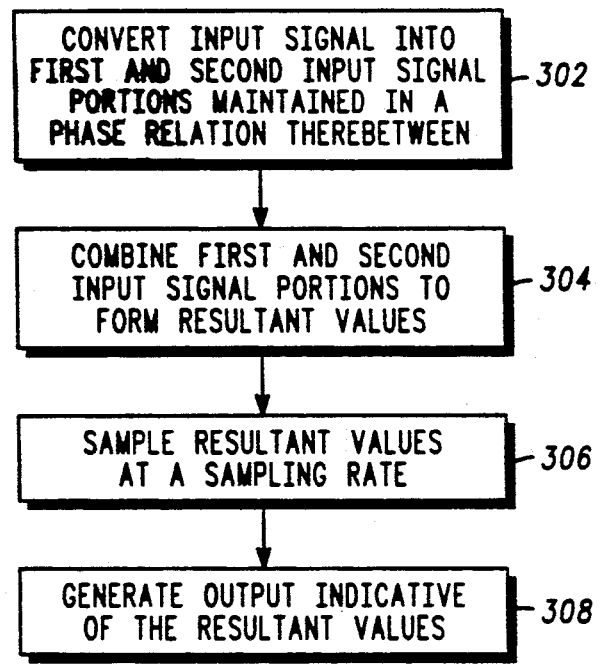
FIG. 8 is a logical flow diagram listing the steps of the method of the present invention.

The flow diagram of FIG. 8 lists the method steps of the method of the present invention. First, and as illustrated by block 302 of the Figure, the input signal, such as, e.g., an encoded voice or other data signal, is converted into first and second input signal portions maintained in a timing relation therebetween.

Next, and as illustrated by block 304, the first and second input signal portions are combined to form resultant values. The resultant values are then sampled at a sampling rate, as illustrated by block 306. Finally, and as illustrated by block 308, an output indicative of the resultant values is generated.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A modulation system for synthesizing a modulated signal at a carrier frequency, said system comprising:
    means for converting an input signal into a first input signal portion and a second input signal portion, with said first and second input signal portions, respectively, being maintained in a ninety-degree phase relation therebetween;
    means forming a first summed value for adding the first data signal portion and the second data signal portion;
    means forming a first difference value for subtracting the second data signal portion from the first data signal portion.
    means forming a second difference value for subtracting the second data signal portion from an inverse of the first data signal portion;
    means forming a second summed value for adding an inverse of the first signal portion and the second signal portion; and
    means for sampling, at a predetermined sampling rate and in a desired, repetitive sequence, the first summed value, the first difference value, the second difference value, and the second summed value, said means for sampling generating an output signal having discrete signal values corresponding to values of the desired repetitive sequence to synthesize the modulated signal thereby.

2. The modulation system of claim 1 further comprising means forming a first register for storing said first summed value.

3. The modulation system of claim 2 further comprising means forming a second register for storing said first difference value.

4. The modulation system of claim 3 further comprising means forming a third register for storing said second difference value.

5. The modulation system of claim 4 further comprising means forming a fourth register for storing said second summed value.

6. The modulation system of claim 5 wherein said predetermined sampling rate is determinative of the carrier frequency of the synthesized, modulated signal formed of the output signal.

7. The modulation system of claim 6 wherein said means for sampling comprises a commutator for sampling said first and second summed values and said first and second difference values, respectively, in said desired, repetitive sequence.

8. The modulation system of claim 7 wherein said commutator comprises a multiplexer for sampling the values stored in said first, second, third, and fourth registers, respectively.

9. The modulation system of claim 1 further comprising means for converting said output signal generated by said means for sampling.

10. The modulation system of claim 9 further comprising means for filtering output signal generated by the means for converting.

11. The modulation system of claim 10 wherein said means for filtering filters output signal of high-frequency harmonic components thereof.

12. A method for synthesizing a modulated signal at a carrier frequency, said method comprising the steps of:
    converting an input signal into a first input signal portion and a second input signal portion, with said first and second input signal portions, respectively, being maintained in a ninety-degree phase relation therebetween;
    adding the first signal portion and the second signal portion to form a first summed value thereby;
    subtracting the second signal portion from the first signal portion to form a first difference value thereby;
    subtracting the second data signal portion from an inverse of the first data signal portion to form a second difference value thereby;
    adding an inverse of the first signal portion and the second signal portion to form a second summed value thereby;
    sampling at a predetermined sampling rate and in a desired, repetitive sequence, the first summed value, the first difference value, the second difference value, and the second summed value; and
    generating an output signal having discrete signal values corresponding to values of the desired repetitive sequence.

13. The method of claim 12 comprising the further step of storing said first summed value in a first register.

14. The method of claim 13 comprising the further step of storing said first difference value in a second register.

15. The method of claim 14 comprising the further step of storing said second difference value in a third register.

16. The method of claim 15 comprising the further step of storing said second summed value in a fourth register.

17. The method of claim 16 wherein the sampling rate at which the resultant values are sampled during said step of sampling is determinative of the carrier frequency of the synthesized, modulated signal formed of the output signal.

18. The method of claim 17 wherein said step of sampling comprises sampling said first and second summed values and said first and second difference values, respectively, in a predetermined sequence.

* * * * *